US012739603B2

(12) United States Patent
Hara et al.

(10) Patent No.: US 12,739,603 B2
(45) Date of Patent: Sep. 15, 2026

(54) DATA VOLUME EXCHANGE SERVER, INTERNATIONAL COMMUNICATION SYSTEM, DATA VOLUME EXCHANGE METHOD, AND DATA VOLUME EXCHANGE PROGRAM

(71) Applicant: NTT, Inc., Tokyo (JP)

(72) Inventors: Daisuke Hara, Musashino (JP); Keiko Kuriu, Musashino (JP)

(73) Assignee: NTT, Inc., Tokyo (JP)

(*) Notice: Subject to any disclaimer, the term of this patent is extended or adjusted under 35 U.S.C. 154(b) by 833 days.

(21) Appl. No.: 17/928,317

(22) PCT Filed: Jun. 4, 2020

(86) PCT No.: PCT/JP2020/022059
§ 371 (c)(1),
(2) Date: Nov. 29, 2022

(87) PCT Pub. No.: WO2021/245864
PCT Pub. Date: Dec. 9, 2021

(65) Prior Publication Data
US 2023/0217219 A1 Jul. 6, 2023

(51) Int. Cl.
*H04W 4/24* (2024.01)
*H04M 15/00* (2024.01)
*H04W 8/18* (2009.01)

(52) U.S. Cl.
CPC ......... *H04W 4/24* (2013.01); *H04M 15/8038* (2013.01); *H04W 8/183* (2013.01); *H04M 2215/34* (2013.01)

(58) Field of Classification Search
CPC ... H04W 4/24; H04W 8/183; H04M 15/8038; H04M 2215/34; H04M 15/41;
(Continued)

(56) References Cited

U.S. PATENT DOCUMENTS

2016/0088461 A1* 3/2016 Jiang .................. H04M 3/4878
455/432.1
2017/0118622 A1* 4/2017 Jiang ...................... H04W 8/12
(Continued)

OTHER PUBLICATIONS

NTT Docomo, Inc., "Packet pack overseas option," nttdocomo.co.jp, retrieved on Apr. 23, 2020, retrieved from URL <https://www.nttdocomo.co.jp/service/world/roaming/ppko/>, 13 pages (with English Translation).

(Continued)

*Primary Examiner* — Matthew D. Anderson
(74) *Attorney, Agent, or Firm* — Fish & Richardson P.C.

(57) ABSTRACT

A data volume exchange server includes a terminal IF unit configured to receive an exchange request for a contract data volume of an own country and a contract data volume of another country from terminals of subscribers having contract data volumes of telecommunication carriers of countries different from each other, a data volume exchange unit configured to perform matching of a pair in which another country that requests a contract data volume in one of the received exchange requests matches the own country that provides a contract data volume in another of the received exchange requests, and a server IF unit configured to instruct the communication servers of the telecommunication carriers in the countries to transfer a contract data volume of a matched subscriber of the own country as an exchanged data volume of a subscriber of the other country who is a matching partner.

5 Claims, 19 Drawing Sheets

(58) Field of Classification Search
CPC ...... H04M 15/57; H04M 15/44; H04M 15/49; H04M 15/51; H04M 15/80; H04M 15/8033; H04M 15/8083; H04M 17/02; H04M 3/42; H04M 15/00; H04M 15/8044; H04M 15/8214; H04M 15/85; H04M 17/103; H04L 12/14
See application file for complete search history.

(56) References Cited

U.S. PATENT DOCUMENTS

| | | | | |
|---|---|---|---|---|
| 2017/0272930 | A1* | 9/2017 | Jiang | H04M 15/8055 |
| 2018/0146361 | A1* | 5/2018 | Jiang | H04W 4/02 |
| 2019/0380027 | A1* | 12/2019 | Thorn | H04W 8/183 |
| 2020/0045519 | A1* | 2/2020 | Raleigh | H04W 4/08 |

OTHER PUBLICATIONS

Optage Inc., "Mineo, packet share," mineo.jp, retrieved on May 25, 2020, retrieved from URL <https://mineo.jp/service/data/packet-share/>, 9 pages (with English Translation).

* cited by examiner

| SMARTPHONE ID | CONTRACT COMPANY | SUBSCRIBER ID | COUNTRY OF TRAVEL | TRAVEL START DATE AND TIME | TRAVEL END DATE AND TIME | NECESSARY DATA VOLUME |
|---|---|---|---|---|---|---|
| P-John | X COMPANY | John | Japan | 7/24 | 8/9 | 3GB |
| P-Tanaka | Y COMPANY | Tanaka | US | 8/1 | 8/10 | 5GB |

| SMARTPHONE ID 1 | SMARTPHONE ID 2 | EXCHANGE START DATE AND TIME | EXCHANGE END DATE AND TIME | EXCHANGE DATA VOLUME |
|---|---|---|---|---|
| P-John | P-Tanaka | 8/1 | 8/9 | 3GB |

Figure 11:
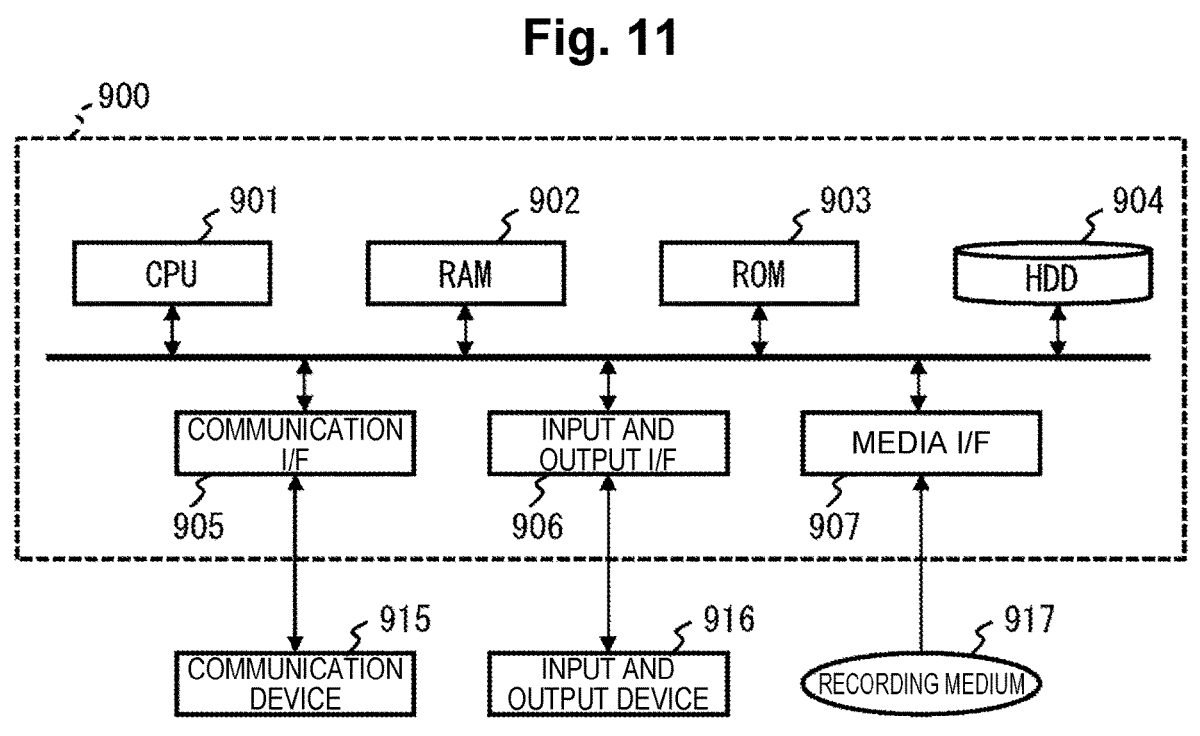

901 CPU

902 RAM

903 ROM

904 HDD

905 COMMUNICATION I/F

906 INPUT AND OUTPUT I/F

907 MEDIA I/F

915 COMMUNICATION DEVICE

916 INPUT AND OUTPUT DEVICE

917 RECORDING MEDIUM

| SMARTPHONE ID 1 | SMARTPHONE ID 2 | EXCHANGE START DATE AND TIME | EXCHANGE END DATE AND TIME | EXCHANGE DATA VOLUME | RENTAL SIM ID 1 | RENTAL SIM ID 2 |
| --- | --- | --- | --- | --- | --- | --- |
| P-John | P-Tanaka | 8/1 | 8/9 | 3GB | P-John-SIM2 | P-Tanaka-SIM2 |

| RENTAL SIM ID | CONTRACT COMPANY | CONTRACT COUNTRY | CONTRACT DATA VOLUME | RESERVATION START DATE AND TIME | RESERVATION END DATE AND TIME |
|---|---|---|---|---|---|
| P-John-SIM2 | Y COMPANY | Japan | 3GB | 8/1 | 8/9 |
| P-Tanaka-SIM2 | X COMPANY | US | 3GB | 8/1 | 8/9 |

DATA VOLUME EXCHANGE SERVER, INTERNATIONAL COMMUNICATION SYSTEM, DATA VOLUME EXCHANGE METHOD, AND DATA VOLUME EXCHANGE PROGRAM

CROSS-REFERENCE TO RELATED APPLICATIONS

This application is a National Stage application under 35 U.S.C. § 371 of International Application No. PCT/JP2020/022059, having an International Filing Date of Jun. 4, 2020.

The disclosure of the prior application is considered part of the disclosure of this application, and is incorporated by reference in its entirety into this application.

TECHNICAL FIELD

The present invention relates to a data volume exchange server, an international communication system, a data volume exchange method, and a data volume exchange program.

BACKGROUND ART

There has been proposed a service for a subscriber of a mobile service usable in his or her own country (a country of residence) to perform mobile data communication using the same terminal not only in the own country but also in an overseas travel destination. Data communication services in a travel destination are classified below.

(Service A) A method of using international roaming of a mobile data communication service contracted in the own country. For example, Non-Patent Literature 1 introduces a service for using a data volume of a telecommunication carrier in the own country at the time of the international roaming. An overseas traveler can access the Internet from a terminal of the overseas traveler via an overseas relay station adapted to the international roaming.

(Service B) A method of renting a mobile router usable in a travel destination separately from the contract in the own country. The overseas traveler can access the Internet from the terminal of the overseas traveler using the mobile router as a repeater.

(Service C) A method of newly purchasing a SIM (Subscriber Identify Module) usable in the travel destination separately from the contract in the own country. The overseas traveler can access the Internet by inserting the newly purchased SIM into the terminal of the overseas traveler.

Non-Patent Literature 2 introduces a service for enabling a subscriber to share, in a single telecommunication carrier in his or her own country, a data volume contracted beforehand with other subscribers.

CITATION LIST

Non-Patent Literature

Non-Patent Literature 1: NTT docomo, "Packet pack overseas option", [online], [searched on May 25, 2020], Internet <URL: https://www.nttdocomo.co.jp/service/world/roaming/ppko/>

Non-Patent Literature 2: mineo, "packet share", [online], [searched on May 25, 2020], Internet <URL: https://mineo.jp/service/data/packet-share/>

SUMMARY OF THE INVENTION

Technical Problem

In a data communication service in a travel destination of related art such as the services A to C, a data communication charge in the travel destination is higher compared with a data communication charge in a telecommunication carrier in a user's own country. It is hard for the user to feel free to use data communication in an overseas travel destination.

In the method described in Non-Patent Literature 1, since the data volume in the own country is consumed, a fee is necessary, although the fee is lower than a fee of normal international roaming. Therefore, a data communication charge is higher compared with a data communication charge in the own country.

The method described in Non-Patent Literature 2 is not adapted to a service for sharing a data volume in a plurality of telecommunication carriers.

Therefore, a main object of the present invention is to inexpensively provide mobile data communication in an overseas travel destination.

Means for Solving the Problem

In order to solve the problems described above, a data volume exchange server of the present invention has the following characteristics.

The data volume exchange server of the present invention includes:

- a terminal IF unit configured to receive an exchange request for a contract data volume of an own country and a contract data volume of another country from terminals of subscribers having contract data volumes of telecommunication carriers of countries different from each other;
- a data volume exchange unit configured to perform matching of a pair in which another country that requests a contract data volume in one of the received exchange requests matches the own country that provides a contract data volume in another of the received exchange requests; and
- a server IF unit configured to instruct communication servers of the telecommunication carriers in the countries to transfer a contract data volume of a matched subscriber of the own country as an exchanged data volume of a subscriber of the other country who is a matching partner.

Effects of the Invention

According to the present invention, it is possible to inexpensively provide mobile data communication in an overseas travel destination.

BRIEF DESCRIPTION OF DRAWINGS

FIG. 1 is a configuration diagram of an international communication system before travel of subscribers of eSIMs (Embedded-SIMs) according to an embodiment.

FIG. 3 is an explanatory diagram of a charging example in the international communication system shown in FIG. 1 according to the embodiment.

FIG. 9 is a configuration diagram of an exchange request table according to the embodiment.

FIG. 10 is a configuration diagram of a matching table according to the embodiment.

FIG. 11 is a hardware configuration diagram of the data volume exchange server according to the embodiment.

FIG. 12 is a configuration diagram of an international communication system before travel of subscribers of physical SIMs according to the embodiment.

FIG. 13 is a configuration diagram of the international communication system after the travel of the subscribers of the physical SIMs according to the embodiment.

FIG. 18 is a configuration diagram of a matching table according to the embodiment.

FIG. 19 is a configuration diagram of a rental SIM management table according to the embodiment.

DESCRIPTION OF EMBODIMENTS

Figure 2:
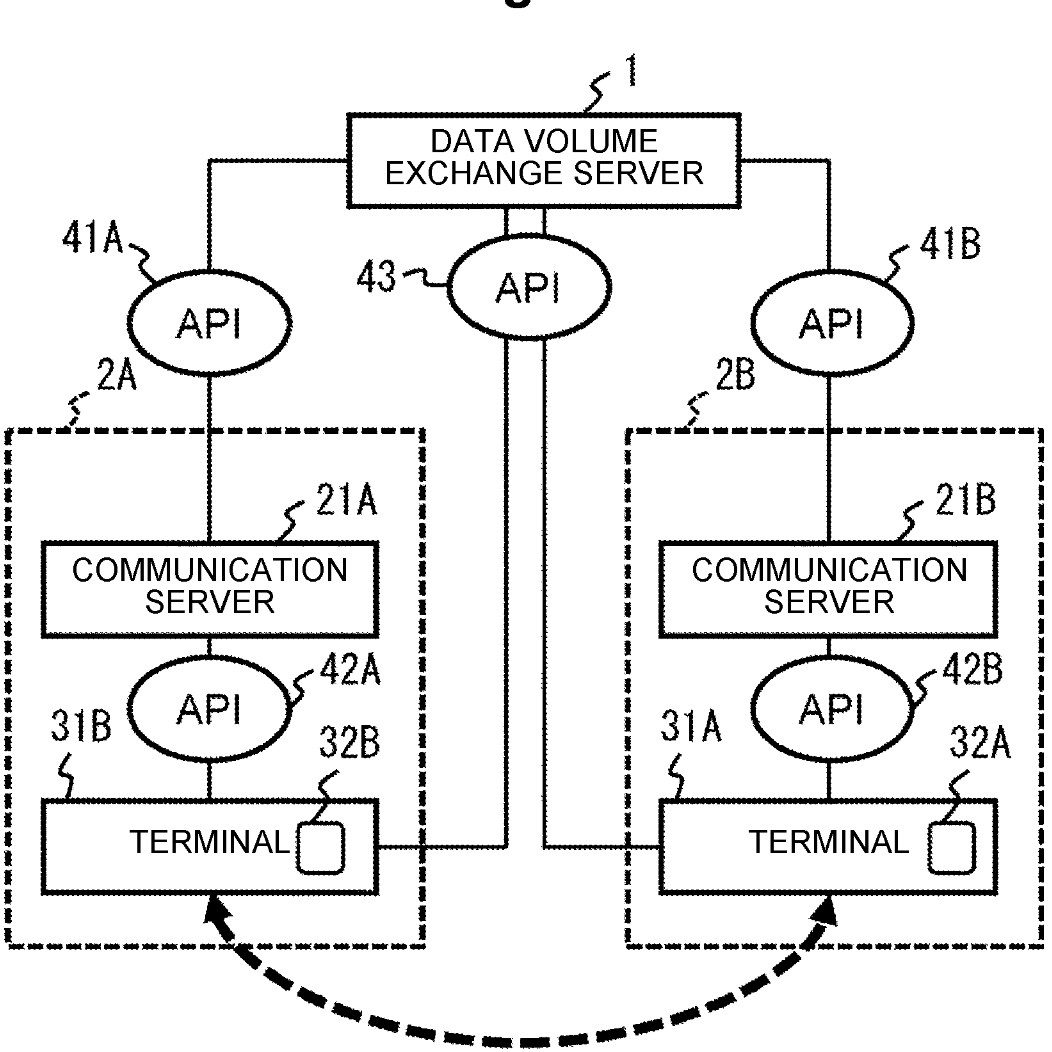
FIG. 2 is a configuration diagram of the international communication system after the travel of the subscribers of the eSIMs according to the embodiment.

An embodiment of the present invention is explained in detail below with reference to the drawings.

Figure 1:
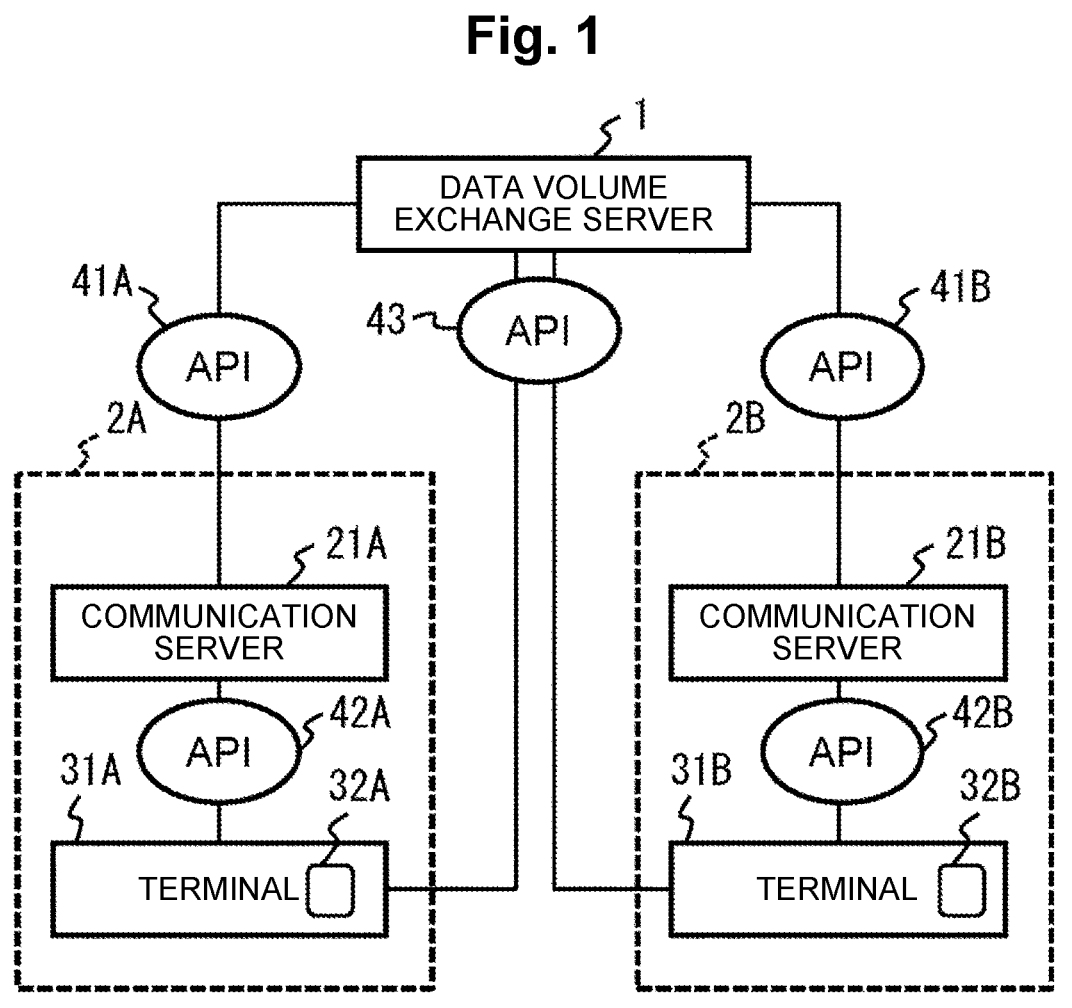

FIG. 1 is a configuration diagram of an international communication system before travel of subscribers of eSIMs.

In the international communication system, telecommunication carriers provide communication services to subscribers respectively in an A country 2A and a B country 2B.

The telecommunication carrier in the A country 2A manages a data volume usable by a terminal 31A of a subscriber of the telecommunication carrier using a communication server 21A. The telecommunication carrier in the B country 2B manages a data volume usable by a terminal 31B of a subscriber of the telecommunication carrier using a communication server 21B.

The usable data volume is a remaining data volume obtained by subtracting a used data volume consumed to the present from a contract data volume provided according to a contract plan.

The terminal 31A includes an eSIM 32A that stores setting for enabling communication with a base station (not shown) in the A country 2A. The terminal 31B includes an eSIM 32B that stores setting for enabling communication with a base station (not shown) in the B country 2B.

Note that a SIM is an IC (Integrated Circuit) chip that performs communication setting for enabling a terminal attached to the IC chip to communicate. An eSIM is a SIM obtained by virtualizing a function of a physical SIM with software. Whereas the physical SIM is physically attached to and detached from a terminal, the eSIM can be rewritten from the outside without physical labor.

The telecommunication carrier in the A country 2A controls (rewrites) the eSIM 32A from the communication server 21A via an API 42A. The telecommunication carrier in the B country 2B controls the eSIM 32B from the communication server 21B via an API 42B.

For the purpose of an operation cost reduction and the like by automation, the telecommunication carriers provide the APIs 42A and 42B that control the SIMs. For example, in a wholesale mobile access API provided by NTT communications <URL: https://developer.ntt.com/ja/apidocs/NS/wholesale-mobile-access/wholesale-mobile-access>, it is possible to instruct line activation (use enabling), line deactivation (use stop), line plan change, line additional charge, and the like from an outside system.

As a main characteristic of this embodiment, the international communication system includes a data volume exchange server 1.

The data volume exchange server 1 performs matching of data volumes to be exchanged (transferred) between the terminals 31A and 31B of the telecommunication carriers different from each other and exchanges the data volumes between the matched terminals 31A and 31B.

Consequently, the terminal 31A can consume a contracted data volume of the terminal 31A and communicate in the A country 2A, which is its own country, and can consume a data volume exchanged and given from the subscriber of the terminal 31B and communicate in the B country 2B, which is a foreign travel destination.

Similarly, the terminal 31B can consume a contracted data volume of the terminal 31B and communicate in the B country 2B, which is its own country, and can consume a data volume exchanged and given from the subscriber of the terminal 31A and communicate in the A country 2A, which is a foreign travel destination.

The data volume exchange server 1 includes an API 43 for receiving data volume exchange requests respectively from the terminal 31A and the terminal 31B.

Further, the data volume exchange server 1 includes an API 41A for requesting the communication server 21A to transfer a data volume. Similarly, the data volume exchange server 1 includes an API 41B for requesting the communication server 21B to transfer a data volume.

FIG. 2 is a configuration diagram of the international communication system after the travel of the subscribers of the eSIMs.

A user of the terminal 31A is present in the B country 2B, which is the foreign travel destination, and a user of the terminal 31B is present in the A country 2A, which is the foreign travel destination.

The terminal 31A can consume a data volume exchanged before the travel shown in FIG. 1 and communicate in the B country 2B. The terminal 31A receives setting for the communication from the communication server 21B and rewrites the eSIM 32A based on content of the reception.

Similarly, the terminal 31B can consume a data volume exchanged before the travel shown in FIG. 1 and communicate in the A country 2A.

Figure 3:
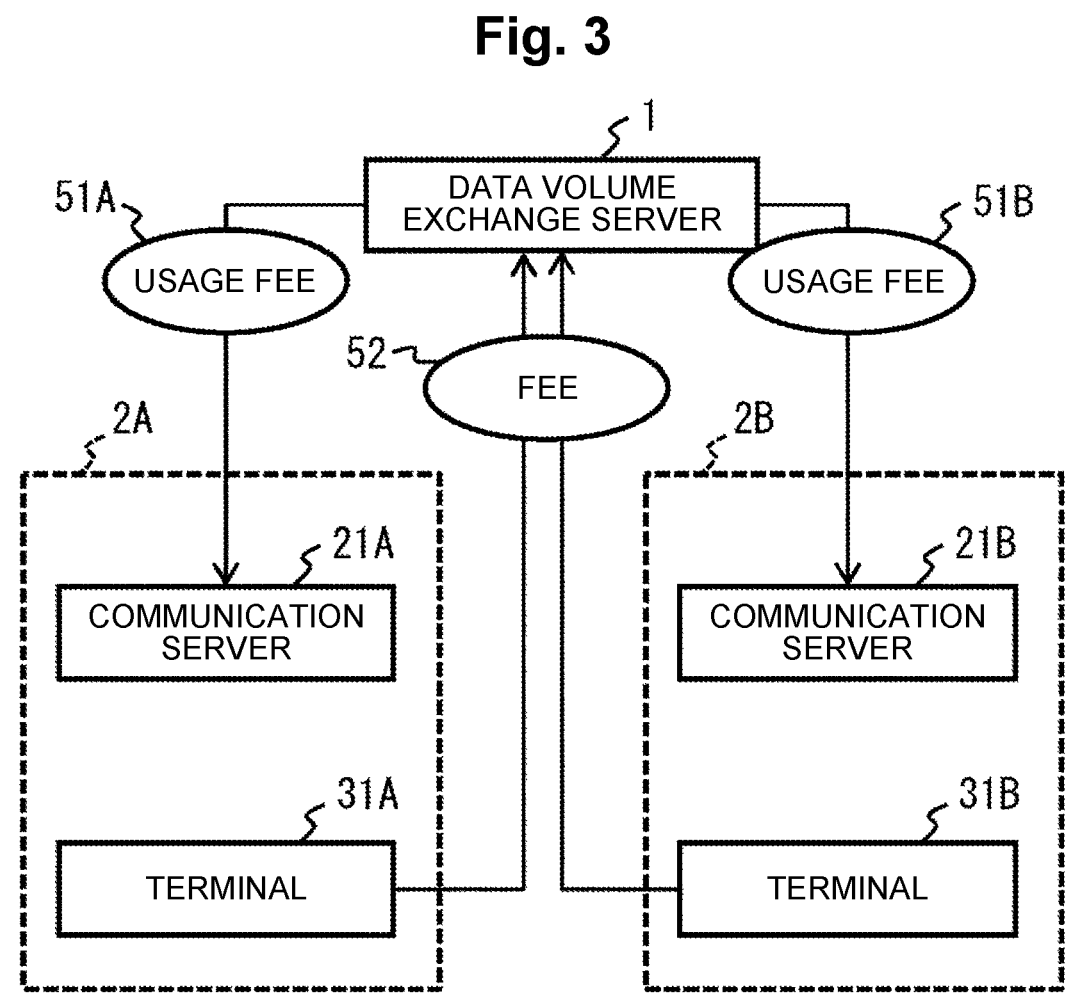

FIG. 3 is an explanatory diagram of a charging example in the international communication system shown in FIG. 1.

The subscriber of the terminal 31A and the subscriber of the terminal 31B respectively pay fees 52 for matching to a provider of the data volume exchange server 1.

The provider of the data volume exchange server 1 pays a usage fee 51A for the eSIM 32A to the telecommunication carrier of the communication server 21A and pays a usage fee 51B for the eSIM 32B to the telecommunication carrier of the communication server 21B. A total of the fees 52 of the two subscribers is set larger than a total of the usage fees 51A and 51B.

Figure 4:
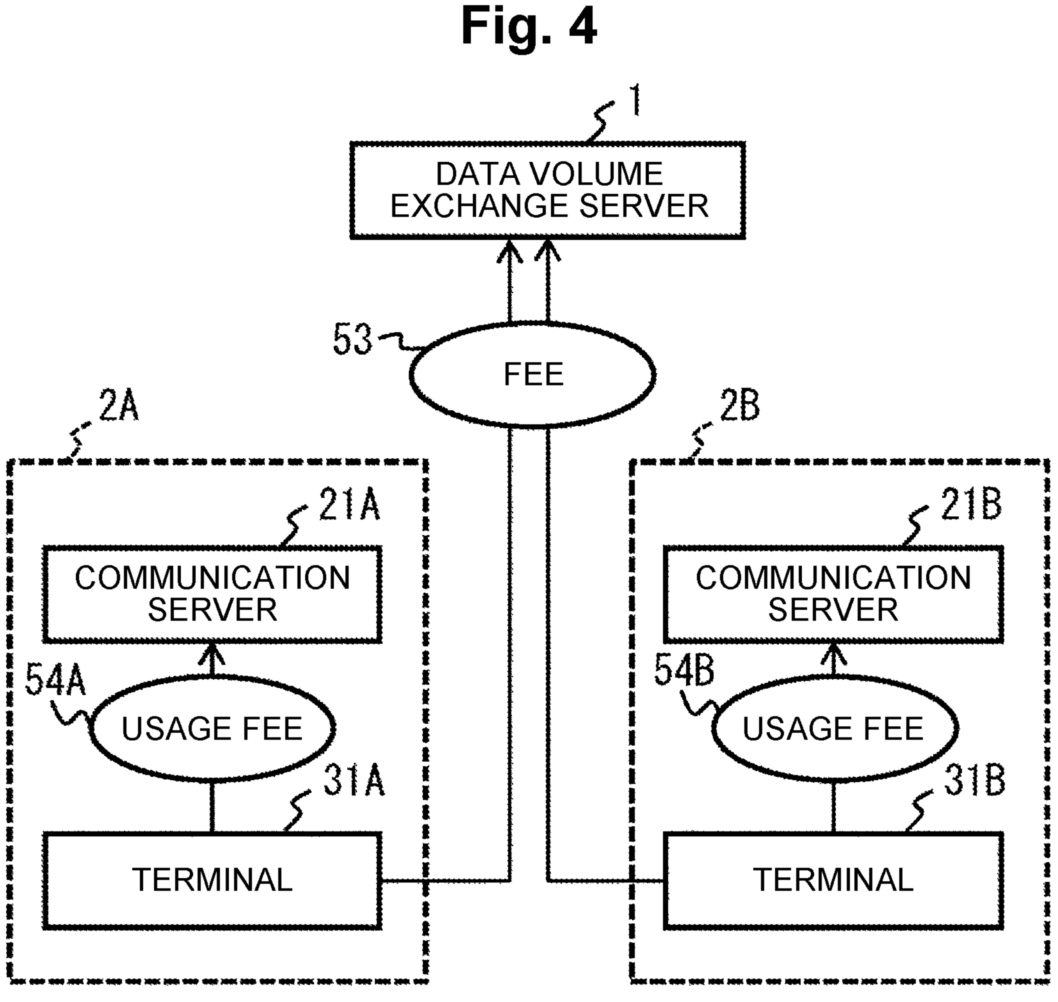
FIG. 4 is an explanatory diagram of a charging example different from the charging example shown in FIG. 3 according to the embodiment.

FIG. 4 is an explanatory diagram of a charging example different from the charging example shown in FIG. 3.

The subscriber of the terminal 31A and the subscriber of the terminal 31B respectively pay fees 53 for matching to the provider of the data volume exchange server 1.

The subscriber of the terminal 31A pays a usage fee 54A for the eSIM 32A to the telecommunication carrier of the communication server 21A. The subscriber of the terminal 31B pays a usage fee 54B for the eSIM 32B to the telecommunication carrier of the communication server 21B.

Figure 5:
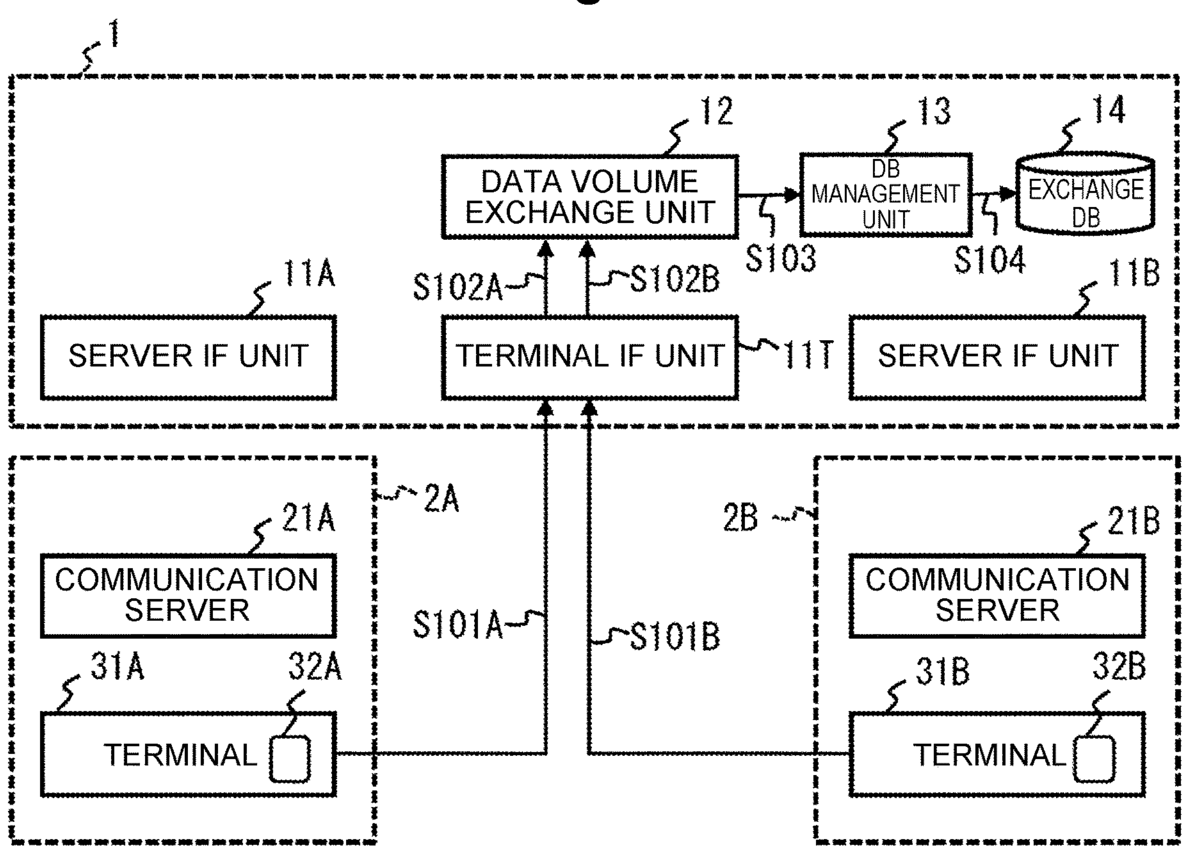
FIG. 5 is an explanatory diagram of a signal in the international communication system before the travel and a configuration of a data volume exchange server according to the embodiment.

FIG. 5 is an explanatory diagram of a signal in the international communication system before the travel and a configuration of the data volume exchange server.

The data volume exchange server 1 includes a terminal IF unit 11T, a server IF unit 11A, a server IF unit 11B, a data volume exchange unit 12, a DB management unit 13, and an exchange DB 14. In the following explanation, the components of the data volume exchange server 1 are clarified.

The terminal IF unit 11T receive data volume exchange requests respectively from the terminals 31A and 31B (S101A and S101B) and notifies the exchange requests to the data volume exchange unit 12 (S102A and S102B). The exchange requests include the following information.

Individual identification numbers and subscriber IDs of the terminals 31A and 31B themselves.

Contract telephone companies of the communication servers 21A and 21B, which are partners to contracts of the terminals 31A and 31B.

Data volume exchange conditions (a country of travel, a travel start date and time, a travel end date and time, and a necessary data volume).

The data volume exchange unit 12 performs matching of the received exchange requests to satisfy the following certain fulfilment conditions.

Certain fulfilment condition: Travel destinations are paired with each other (an own country of one of the terminals=a travel destination of the other of the terminals and a travel destination of one of the terminals=an own country of the other of the terminals).

Certain fulfilment condition: Overlapping periods are present in travel periods of the terminals.

Note that, when a plurality of pairs satisfying the certain fulfilment conditions are present, the data volume exchange unit 12 may preferentially adopt a pair having a long overlapping period or may preferentially adopt a pair having necessary data volumes close to each other.

The data volume exchange unit 12 notifies an exchange request based on which matching is performed and a matching result for the exchange request to the DB management unit 13 (S103). The DB management unit 13 writes the notified exchange request and the notified matching result in the exchange DB 14 (S104).

Note that, in the matching, the data volume exchange unit 12 may confirm a usable data volume with the communication servers 21A and 21B via the server IF units 11A and 11B and, when a necessary data volume exceeds the usable data volume, correct the necessary data volume to be equal to or smaller than the usable data volume.

For example, when a certain subscriber transmits a data volume exchange request for setting the necessary data volume to 3 GB despite the fact that a remaining data volume usable in his or her own country is 1 GB, excess 2 GB cannot be provided to a matching partner. Accordingly, the data volume exchange unit 12 corrects the necessary data volume to request the matching partner to provide, as the necessary data volume, only 1 GB that the subscriber can provide.

Figure 6:
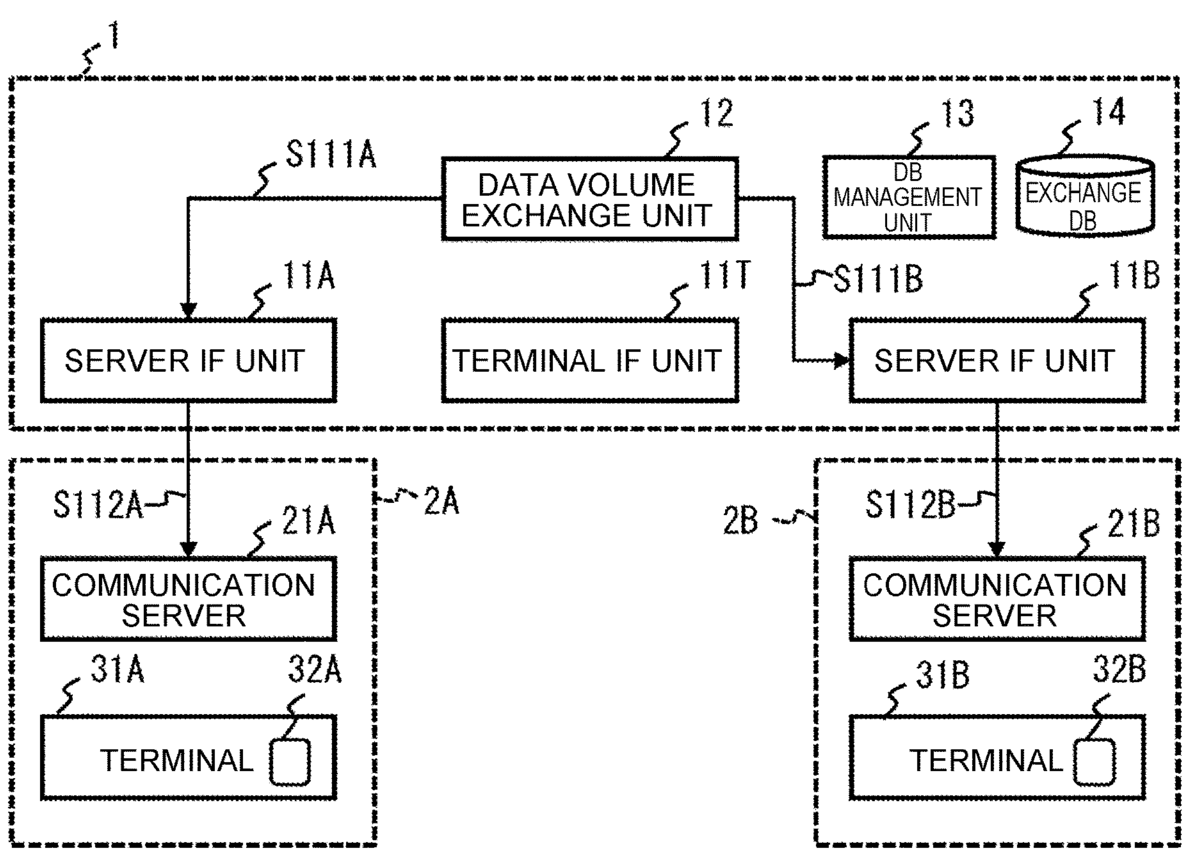
FIG. 6 is an explanatory diagram showing a response to the signal shown in FIG. 5 according to the embodiment.

FIG. 6 is an explanatory diagram showing a response to the signal shown in FIG. 5.

The data volume exchange unit 12 notifies data volume transfer requests to the server IFs 11A and 11B as responses to a pair of exchange requests for which matching is established (S111A and S111B). The transfer requests include the following information.

Individual identification numbers and subscriber IDs of the terminals 31A and 31B of the subscribers (exchange sources).

Individual identification numbers of the terminals 31A and 31B of temporary users (exchange destinations).

Data volume exchange contents (an exchange start date and time, an exchange end date and time, and an exchanged data volume).

For example, a transfer request of the A country 2A for "transferring 3 GB of a contract data volume of 7 GB of an exchange source to an individual identification number of a transfer destination" and a transfer request of the B country 2B for "transferring 3 GB of a contract data volume of 10 GB of an exchange source to an individual identification number of an exchange destination" are a pair of matching.

The server IF units 11A and 11B transfer, via the APIs 41A and 41B shown in FIG. 1, the transfer requests in S111A and S111B respectively to the communication servers 21A and 21B of the countries that the server IF units 11A and 11B cover (S112A and S112B). Accordingly, the APIs 41A and 41B are expanded to be capable of transferring a part (for example, 3 GB) of a contract data volume (for example, 10 GB) of a certain eSIM 32A to another eSIM 32B.

A temporary user in the B country 2B is not a direct subscriber for the telecommunication carrier in the A country 2A. Therefore, the APIs 41A and 41B are expanded to correlate the temporary user in the B country 2B with a subscriber of the A country 2A. For example, if the temporary user in the B country 2B is set to be a member of a pseudo family for the subscriber of the A country 2A, the temporary user in the B country 2B is capable of sharing and using a part of a data volume of the subscriber of the A country 2A.

The preparation for travel of the subscriber of the own country is explained above with reference to FIG. 5 and FIG. 6.

Figure 7:
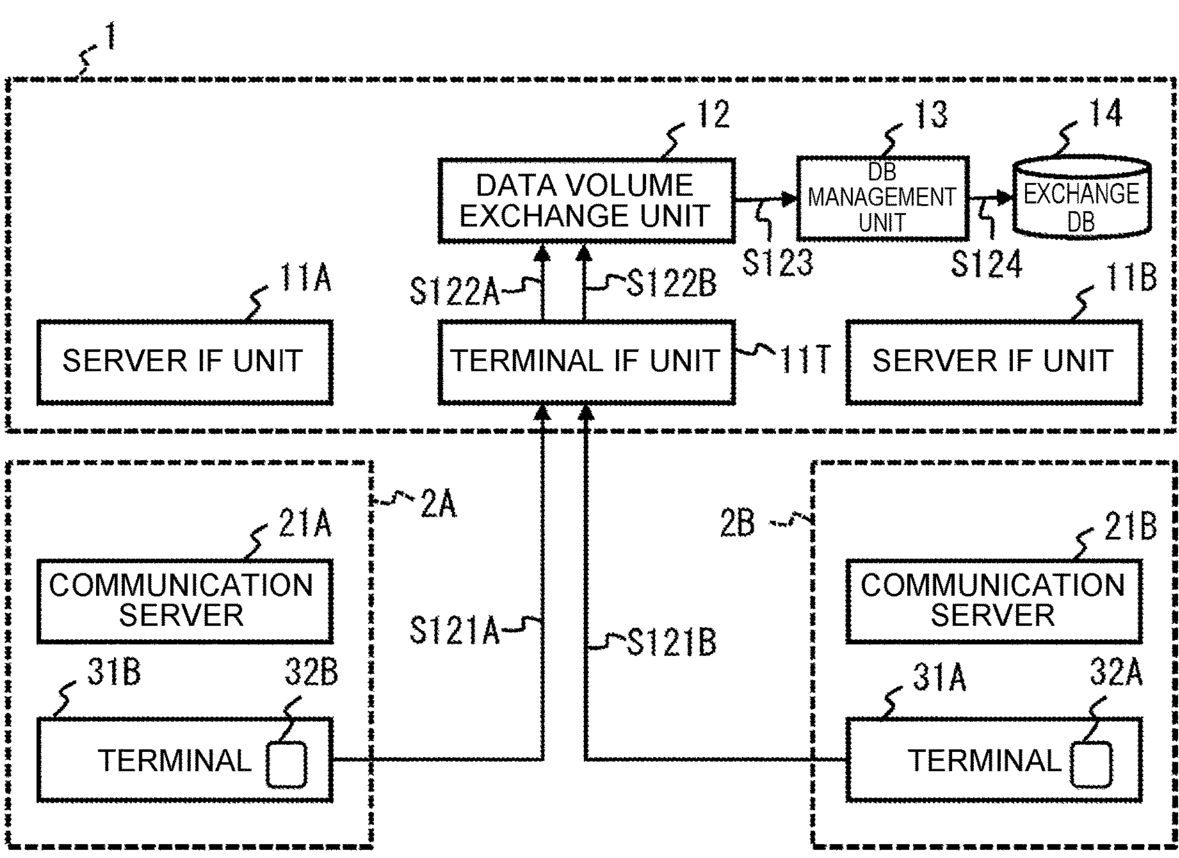
FIG. 7 is an explanatory diagram of a signal in the international communication system after the travel according to the embodiment.

FIG. 7 is an explanatory diagram of a signal in the international communication system after the travel.

A subscriber of the A country 2A carries the terminal 31A and travels to the B country 2B and a subscriber of the B country 2B carries the terminal 31B and travels to the A country 2A.

The terminal IF unit 11T receives travel notifications respectively from the terminals 31A and 31B after the travel (S121A and S121B) and transfers the travel notifications to the data volume exchange unit 12 (S122A and S122B). The travel notifications include individual identification numbers, contract telephone companies, and subscriber IDs.

The data volume exchange unit 12 notifies a pair of the transferred travel notifications to the DB management unit 13 (S123). The DB management unit 13 reads a matching result corresponding to the notified pair of travel notifications from the exchange DB 14 (S124).

Figure 8:
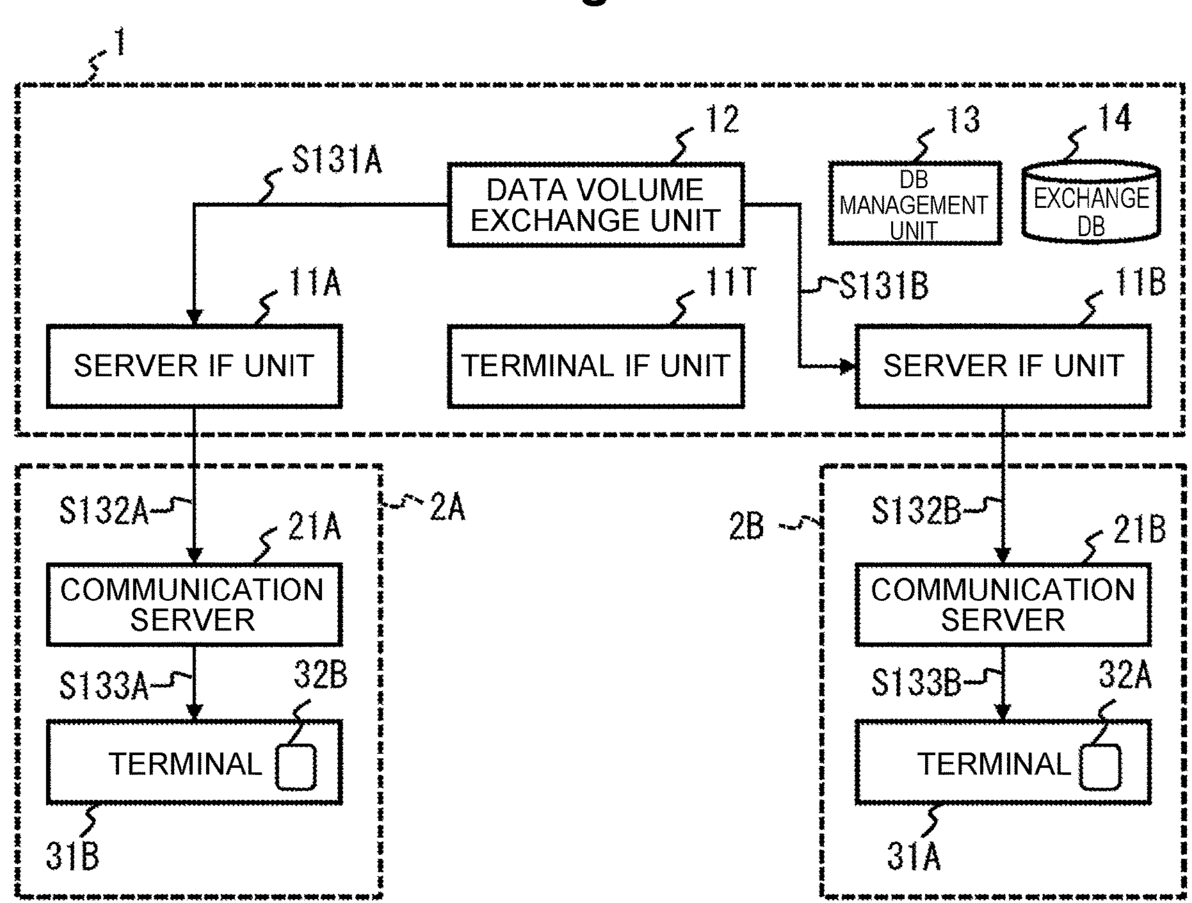
FIG. 8 is an explanatory diagram showing a response to the signal shown in FIG. 7 according to the embodiment.

FIG. 8 is an explanatory diagram showing a response to the signal shown in FIG. 7.

The data volume exchange unit 12 notifies a line activation request including the matching result in S124 to the server IF units 11A and 11B (S131A and S131B). The server IF units 11A and 11B transfer the notified line activation request to the communication servers 21A and 21B (S132A and S132B). The transferred line activation request includes a start date and time of an overlapping period (that is, a use permission period of an exchanged data volume) in travel periods of the subscribers and a data volume (for example, 3 GB) to be exchanged (added) at a start point in time of the overlapping period.

The communication servers 21A and 21B approve a use start of the eSIMs of own companies of the communication servers 21A and 21B based on the line activation request. As a result of the approval, the communication server 21A instructs, at the start date and time designated in the line activation request, the terminal 31B traveling in the A country 2A to perform rewriting to add the data volume (3 GB) designated in the line activation request to the eSIM 32B (S133A).

Similarly, the communication server 21B instructs, at the start date and time designated in the line activation request, the terminal 31A traveling in the B country 2B to perform rewriting to add the data volume (3 GB) designated in the line activation request to the eSIM 32A (S133B).

Note that the processing in S133A and S133B can be executed by utilizing implementation of the existing eSIM rewriting processing.

Specific examples of an exchange request table 141 and a matching table 142A are explained below as details of the exchange DB 14.

FIG. 9 is a configuration diagram of the exchange request table 141.

The exchange request table 141 associates a smartphone ID, a contract company, a subscriber ID, a country of travel, and a travel period (from a travel start date and time to a travel end date and time), and a necessary data volume. The smartphone ID is individual identification numbers of the terminals 31A and 31B and is, for example, IMEI (International Mobile Equipment Identity). On the other hand, the subscriber ID is an identification number of a subscriber and is, for example, IMSI (International Mobile Subscriber Identity).

A subscriber ID "John" in a first row uses, from the terminal 31A (P-John), a line of a contract company "X company" that usually manages the communication server 21A in an own country of the subscriber ID "John", the United States of America (the A country 2A). A data volume exchange request from the terminal 31A (S101A) indicates that the subscriber ID "John" is inviting a partner for exchanging a data volume of 3 GB in Japan in a period of July 24 to August 9. Note that, in this embodiment, only dates of a travel start date and a travel end date are illustrated. However, actually, date and times can be designated.

A subscriber ID "Tanaka" in a second row uses, from the terminal 31B (P-Tanaka), a line of a contract company "Y company" that usually manages the communication server 21B in an own country of the subscriber ID "Tanaka", Japan (the B country 2B). A data volume exchange request from the terminal 31B (S101B) indicates that the subscriber ID "Tanaka" is inviting a partner for exchanging a data volume of 5 GB in the United states of America (US).

FIG. 10 is a configuration diagram of the matching table 142A.

The matching table 142A stores a matching result indicating success of matching by the data volume exchange unit 12 from an entry registered in the exchange request table 141 (S104 in FIG. 5).

Since the travel destinations are paired and the overlapping period is present in the travel periods in the received exchange requests as explained with reference to FIG. 5, the data volume exchange unit 12 matches John and Tanaka from the exchange request table 141 shown in FIG. 9.

The data volume exchange unit 12 associates the matched two smartphone IDs, the overlapping period (the exchange start date and time to the exchange end date and time) in the travel period, and an exchange data volume in the overlapping period. Note that the exchange data volume is a smaller one of necessary data volumes in the exchange request table 141.

Note that the exchange DB 14 (the exchange request table 141 and the matching table 142A) is explained in an RDB (Relational DataBase) format. However, another format such as a KVS (Key-Value Store) format may be adopted.

FIG. 11 is a hardware configuration diagram of the data volume exchange server 1.

The data volume exchange server 1 is configured as a computer 900 including a CPU 901, a RAM 902, a ROM 903, a HDD 904, a communication I/F 905, an input and output I/F 906, and a media I/F 907.

The communication I/F 905 is connected to an external communication device 915. The input and output I/F 906 is connected to an input and output device 916. The media I/F 907 reads data from and writes data in a recording medium 917. Further, the CPU 901 executes a program (called application as well) read in the RAM 902 to thereby control the processing units. The program can be distributed via a communication line or recorded in the recording medium 917 such as a CD-ROM and distributed.

The data volume exchange processing of the internal communication system at the time when the subscribers of the eSIMs travel is explained above with reference to FIG. 1 to FIG. 11. The terminals 31A and 31B adapted to the eSIMs are limited to a new model. However, travelers can smoothly use exchange data volumes of partners to be paired as data volumes of the travelers without labor for directly meeting the partners and handing SIM cards to the partners.

Data volume exchange processing at the time when subscribers of physical SIMs travel is explained below with reference to FIG. 12.

Figure 12:
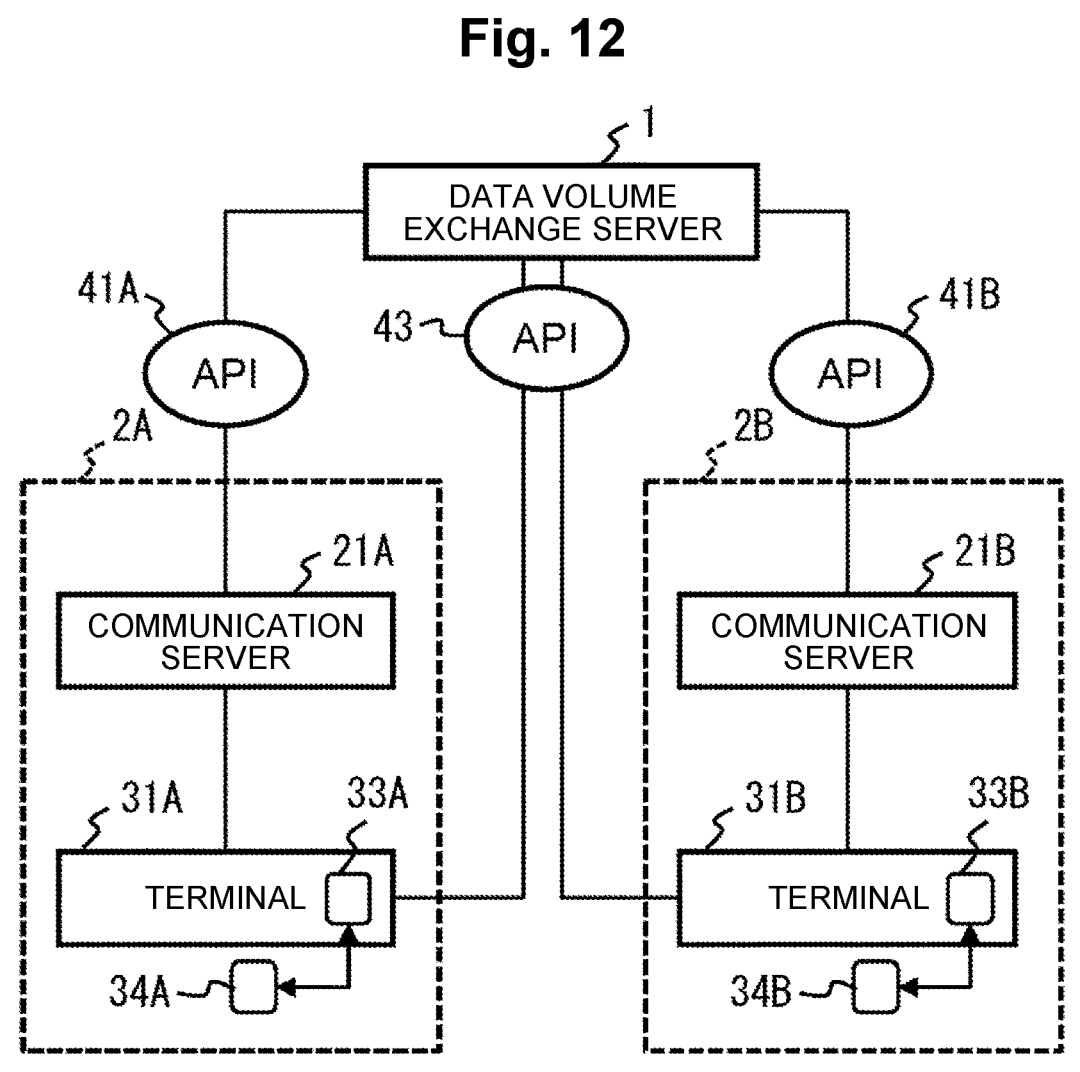

FIG. 12 is a configuration diagram of an international communication system before travel of the subscribers of the physical SIMs. Compared with the international communication system for the eSIMs shown in FIG. 1, the SIM in the terminal 31A is changed from the eSIM 32A to a physical SIM for own country 33A and the SIM in the terminal 31B is changed from the eSIM 32B to a physical SIM for own country 33B.

The physical SIM for own country 33A used by the subscriber of the terminal 31A in the own country (the A country 2A) and a physical SIM for rent 34A used by a matching partner in the A country 2A are provided to the subscriber of the terminal 31A from a telecommunication carrier (of the communication server 21A) in the own country.

The physical SIM for own country 33B used by the subscriber of the terminal 31B in the own country (the B country 2B) and a physical SIM for rent 34B used by a matching partner in the B country 2B are provided to the subscriber of the terminal 31B from a telecommunication carrier (of the communication server 21B) in the own country.

That is, a pair of the physical SIM for own country 33A and the physical SIM for rent 34A is grouped in a single telecommunication carrier and a pair of the physical SIM for own country 33B and the physical SIM for rent 34B is grouped in a single telecommunication carrier. This grouping processing for sharing a data volume is realized using, for example, the service described in Non-Patent Literature 2.

Figure 13:
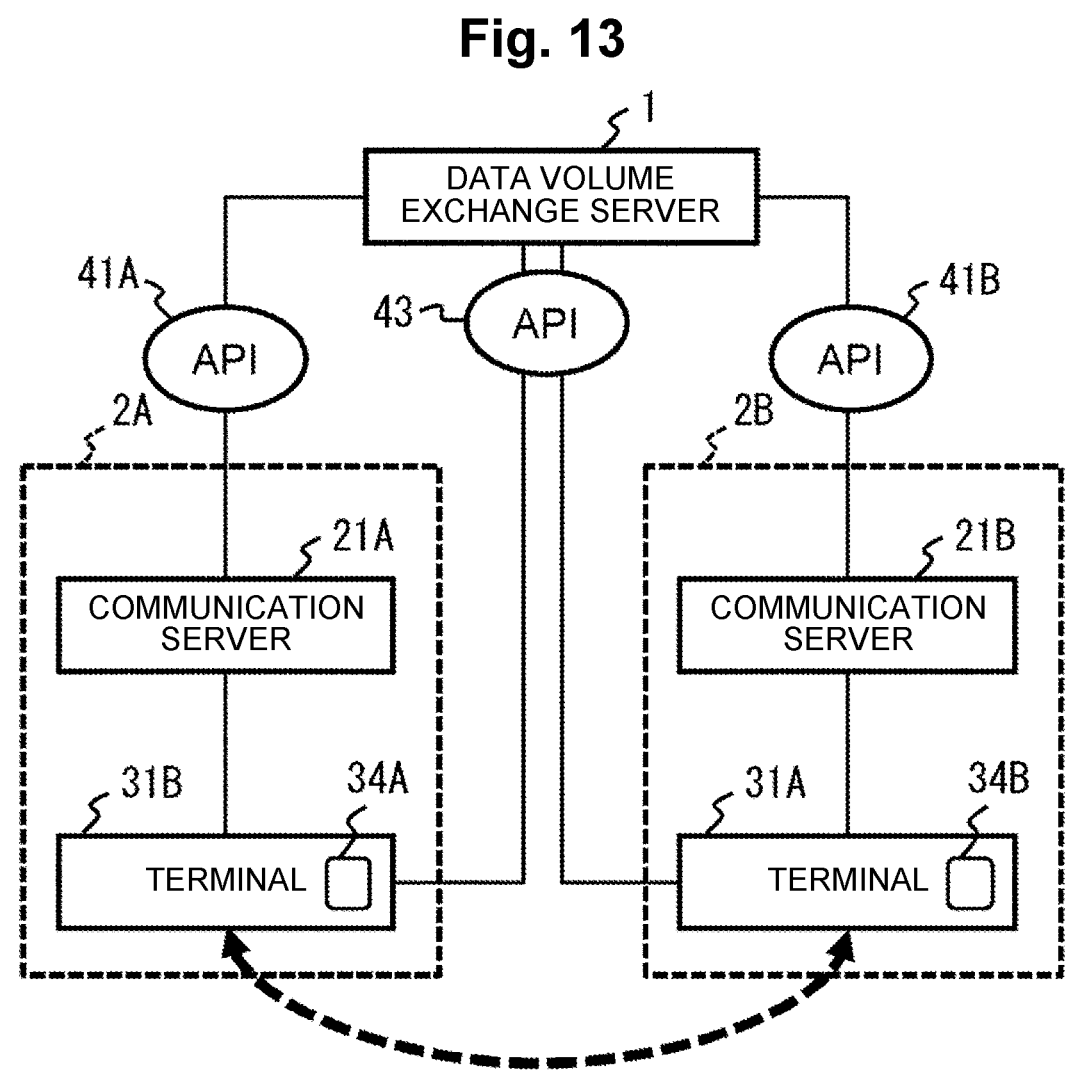

FIG. 13 is a configuration diagram of the international communication system after the travel of the subscriber of the physical SIM. Compared with the international communication system for the eSIM shown in FIG. 2, the international communication system after the travel of the subscriber of the physical SIM is the same in that the user of the terminal 31A travels to the B country 2B and the user of the terminal 31B travels to the A country 2A.

On the other hand, SIMs used in travel destinations are different. The SIM in the terminal 31A is changed from the eSIM 32A shown in FIG. 2 to the physical SIM for rent 34B shown in FIG. 13 and the SIM in the terminal 31B is changed from the eSIM 32B shown in FIG. 2 to the physical SIM for rent 34A shown in FIG. 13. That is, the users of the terminals do not use physical SIMs contracted by the users but temporarily rent physical SIMs from the matching partners and receive data communication services at travel destinations.

Note that business models shown in FIG. 3 and FIG. 4 are applicable to the international communication system shown in FIG. 13 as well by changing usage fees for SIMs paid to telecommunication carriers from the usage fees for the eSIMs 32A and 32B to usage fees for the physical SIMs for rent 34A and 34B.

Figure 14:
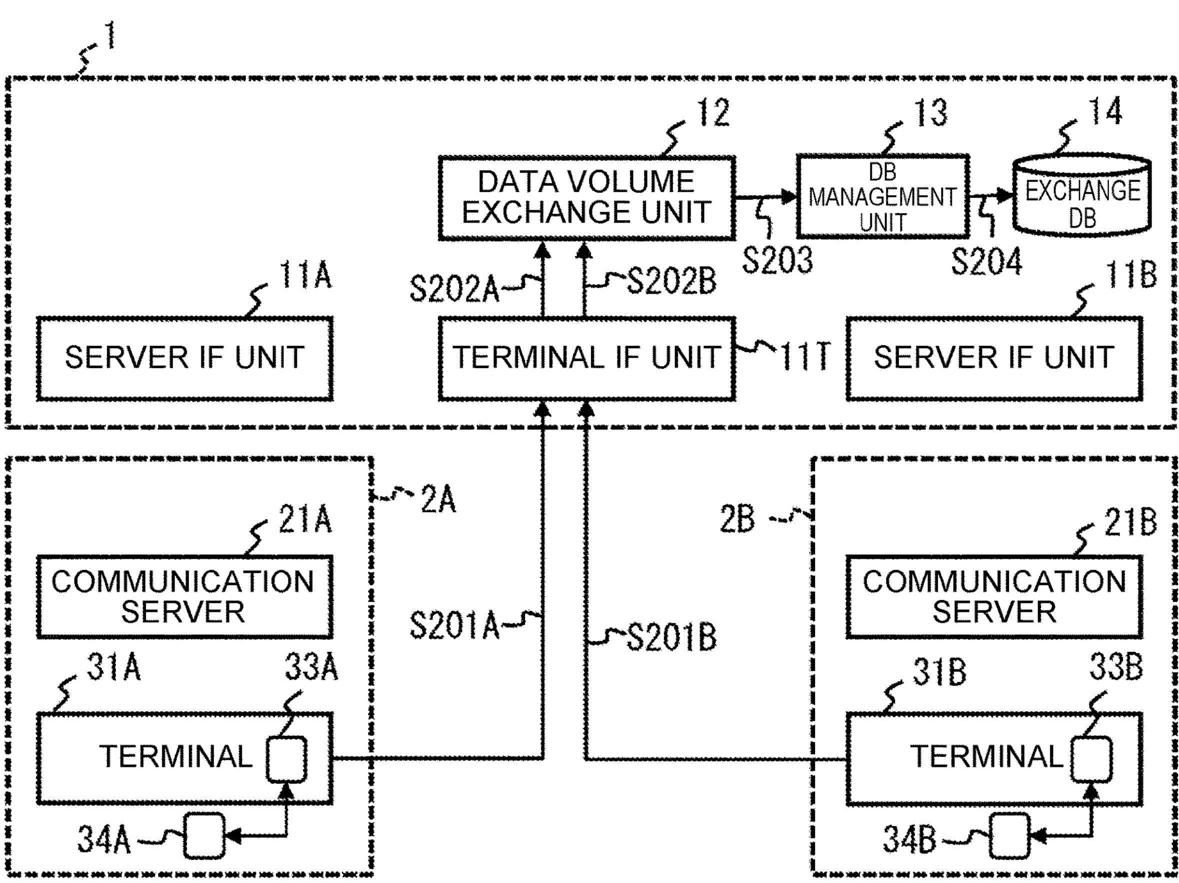
FIG. 14 is an explanatory diagram of a signal in an international communication system before travel according to the embodiment.

FIG. 14 is an explanatory diagram of a signal in an international communication system before travel.

Compared with the international communication system for the eSIM shown in FIG. 5, the processing (S101A, S101B, S102A, and S102B) up to the matching is the same as processing (S201A, S201B, S202A, and S202B) shown in FIG. 14.

On the other hand, after the matching is established, in addition to the processing for writing the notified exchange request and the notified matching result in the exchange DB 14 described in S103 and S104 in FIG. 5, processing for writing information of the physical SIMS for rent 34A and 34B scheduled to be rent out to matching partners in the exchange DB 14 is added (S203 and S204; details are explained below with reference to FIG. 18 and FIG. 19).

Figure 15:
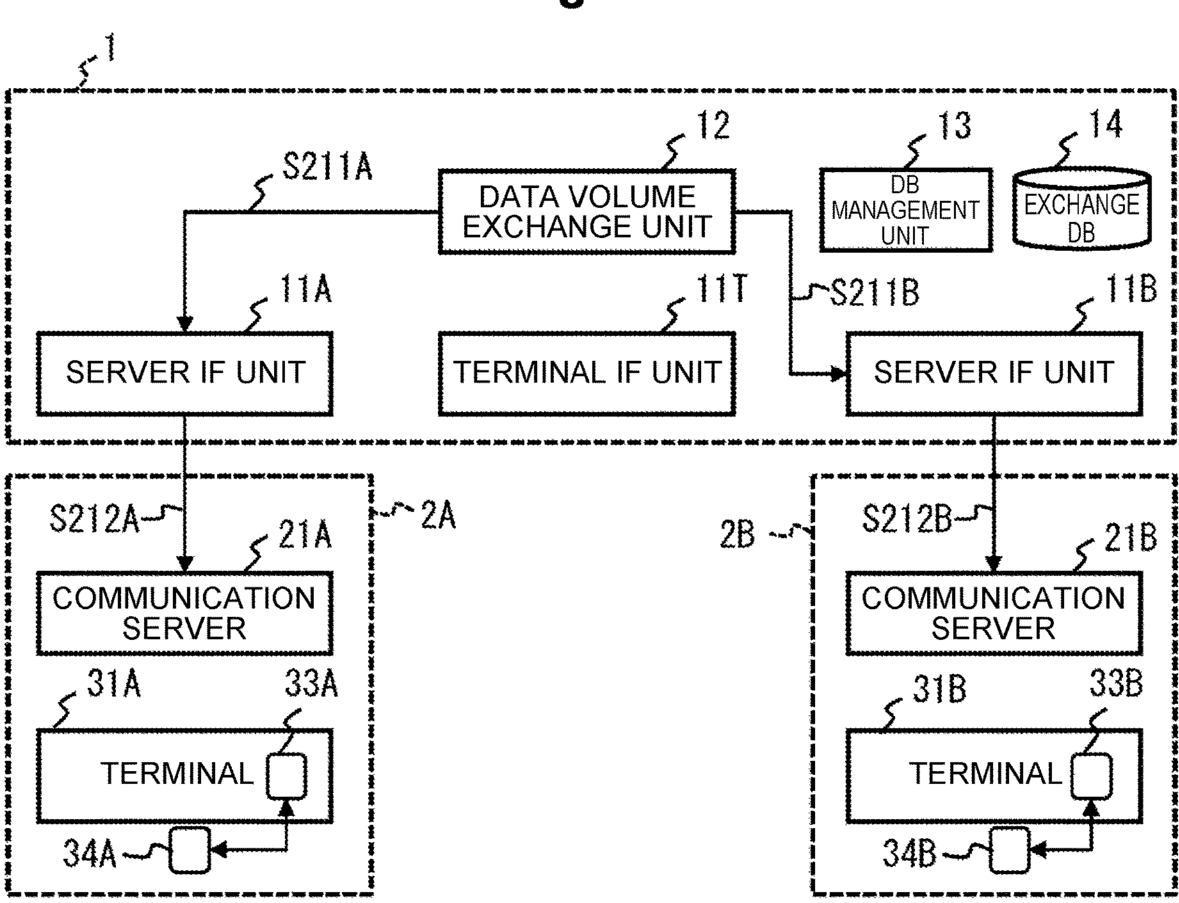
FIG. 15 is an explanatory diagram showing a response to the signal shown in FIG. 14 according to the embodiment.

FIG. 15 is an explanatory diagram showing a response to the signal shown in FIG. 14.

Compared with the international communication system for the eSIM shown in FIG. 6, the request notified from the data volume exchange unit 12 to the server IF units 11A and 11B is changed from the data volume transfer requests (S111A and S111B in FIG. 6) to SIM grouping requests (S211A and S211B in FIG. 15). The SIM grouping requests include the following information.

Individual identification numbers and subscriber IDs of the terminals 31A and 31B of the subscribers (the exchange sources).

IDs of the physical SIMs for rent 34A and 34B that temporary users (exchange destinations) are caused to use in travel destinations.

Data volume exchange contents (an exchange start date and time, an exchange end date and time, and an exchanged data volume).

For example, a transfer request for "causing the physical SIM for rent 34A to use a contract data volume with an upper limit of 3 GB in a contract data volume of 7 GB of the physical SIM for own country 33A" and a transfer request for "causing the physical SIM for rent 34B to use a contract data volume with an upper limit of 3 GB in a contract data volume of 10 GB of the physical SIM for own country 33B" are notified to the server IF units 11A and 11B as the SIM grouping requests.

Figure 16:
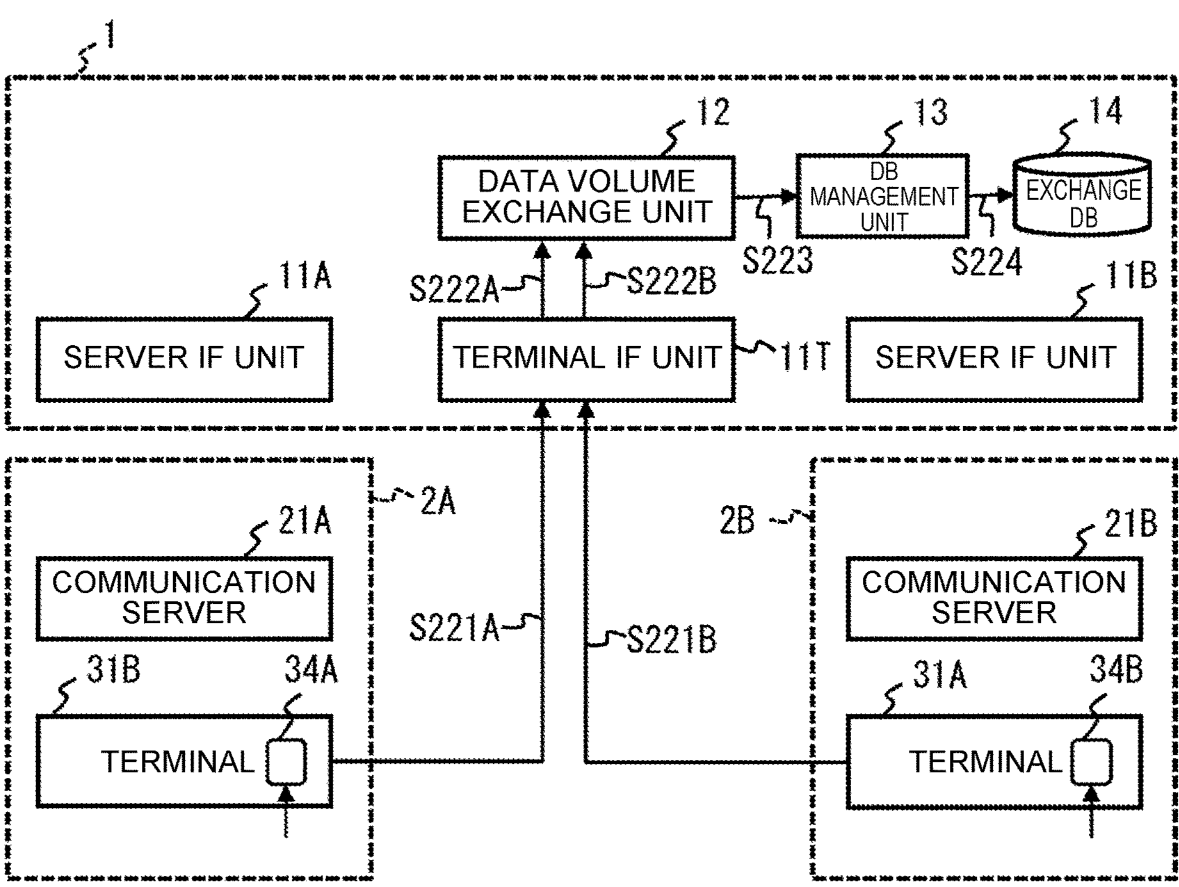
FIG. 16 is an explanatory diagram of a signal in the international communication system after the travel according to the embodiment.

FIG. 16 is an explanatory diagram of a signal in the international communication system after the travel.

The subscriber of the A country 2A carries the terminal 31A and travels to the B country 2B and the subscriber of the B country 2B carries the terminal 31B and travels to the A country 2A. The subscriber of the A country 2A hands the physical SIM for rent 34A to the subscriber of the B country 2B. The subscriber of the B country 2B inserts, in the A country 2A, the handed physical SIM for rent 34A into the terminal 31B of the subscriber of the B country 2B.

Similarly, the subscriber of the B country 2B hands the physical SIM for rent 34B to the subscriber of the A country 2A. The subscriber of the A country 2A inserts, in the B country 2B, the handed physical SIM for rent 34B into the terminal 31A of the subscriber of the A country 2A. In this way, the subscribers perform the SIM transfer work each other.

As in FIG. 7, the terminal IF unit 11T receives travel notifications respectively from the terminals 31A and 31B after the travel (S221A and S221B) and transfers the travel notifications to the data volume exchange unit 12 (S222A and S222B). The travel notifications include individual identification numbers of the terminals 31A and 31B, contract telephone companies, and subscriber IDs.

The data volume exchange unit 12 notifies a pair of the transferred travel notifications to the DB management unit 13 (S223). The DB management unit 13 reads, from the exchange DB 14, a matching result corresponding to the notified pair of travel notifications (S224).

Figure 17:
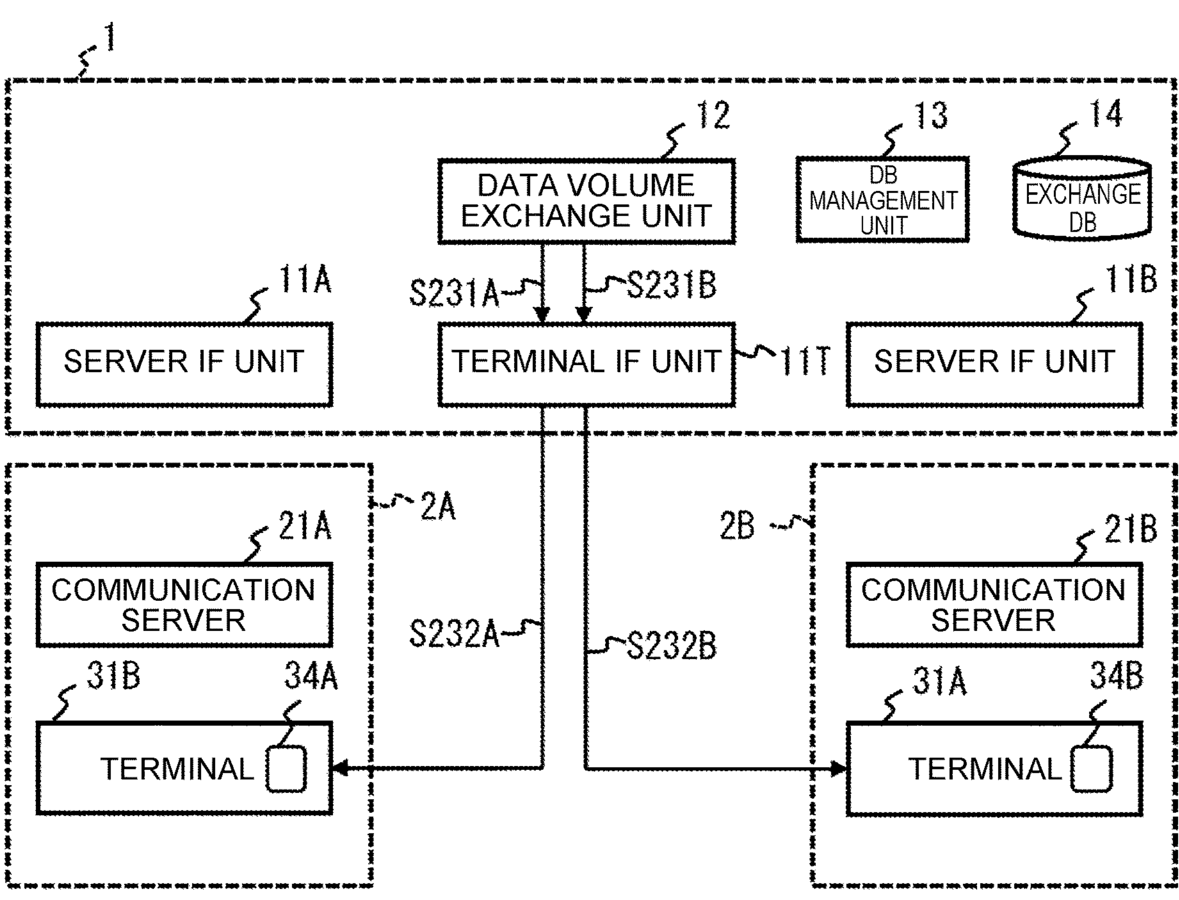
FIG. 17 is an explanatory diagram showing a response to the signal shown in FIG. 16 according to the embodiment.

FIG. 17 is an explanatory diagram showing a response to the signal shown in FIG. 16.

In the international communication system for the eSIM shown in FIG. 8, the use of only the exchange data volume in the travel destination is enabled by the line activation request including the exchange data volume. On the other hand, in the international communication system for the physical SIM shown in FIG. 17, since the physical SIM for rent 34A is issued in the own country (the A country 2A), activation is already finished. Similarly, since the physical SIM for rent 34B is issued in the own country (the B country 2B), activation is already finished. Accordingly, the international communication system for the physical SIM only has to perform communication control for an exchange data volume.

Accordingly, the data volume exchange unit 12 instructs the terminal IF unit 11T to notify an exchange data volume of the matching result read in S224 to the terminal IF unit 11T (S231A and S231B). The terminal IF unit 11T notifies the exchange data volume to the terminals 31A and 31B in the respective countries (S232A and S232B).

Communication control applications in the terminals 31A and 31B monitor communication volumes of the terminals 31A and 31B via the physical SIMS for rent 34A and 34B not to exceed the notified exchange data volume. The communication control applications block the following communication when the communication volumes reach the exchange data volume.

Details of the exchange DB 14 in the internal communication system for the physical SIM are explained below. The exchange DB 14 includes the exchange request table 141 shown in FIG. 9, a matching table 142B shown in FIG. 18, and a rental SIM management table 143 shown in FIG. 19. The exchange request table 141 has the same content as the content of the exchange request table 141 of the international communication system for the eSIM. Therefore, explanation of the content of the exchange request table 141 is omitted.

FIG. 18 is a configuration diagram of the matching table 142B.

In the matching table 142B, a row of an ID pair of the physical SIMs for rent 34A and 34B to be rent out to partners to be matched is added to the matching table 142A shown in FIG. 10.

In S203 and S204 in FIG. 14, "P-John-SIM2" rent out to John present in Japan after travel and "P-Tanaka-SIM2" rent out to Tanaka present in the United States of America after travel are registered as a pair.

FIG. 19 is a configuration diagram of the rental SIM management table 143.

In the rental SIM management table 143, information explaining details of the row of the ID pair of the physical SIMs for rent 34A and 34B added in the matching table 142B is registered.

A rental SIM_ID "P-John-SIM2" in a first row is a physical SIM for enabling a contract data volume of 3 GB from the contract company "Y company" in Japan to be used in a reservation period (from a reservation start date and time of August 1 to a reservation end date and time of August 9).

A rental SIM_ID "P-Tanaka-SIM2" in a second row is a physical SIM for enabling a contract data volume of 3 GB from the contract company "X company" in the United states of America (US) to be used in the reservation period (from the reservation start date and time of August 1 to the reservation end date and time of August 9).

That is, an exchange data volume of the matching table 142B is directly a contract data volume of the rental SIM management table 143. An exchange start date and time to an exchange end date and time of the matching table 142B are directly a reservation start date and time to an exchange end date and time of the rental SIM management table 143.

A reservation period (a reservation start date and time to an exchange end date and time) in the rental SIM management table 143 may be one period or may extend across a plurality of periods (for example, Monday to Friday of the first week of August and Monday to Friday of the second week of August).

The data volume exchange unit 12 refers to the rental SIM management table 143 and extracts the physical SIMs for rent 34A and 34B not reserved yet at a matching time. The data volume exchange unit 12 registers the extracted physical SIMs for rent 34A and 34B in the matching table 142B.

The international communication system for the physical SIM is explained above with reference to FIG. 12 to FIG. 19. In this form, by using a mechanism of data share provided by a telecommunication carrier, additional development for a system (the communication servers 21A and 21B) on the telecommunication carrier side may not be performed.

As explained above, in both of the international communication system for the eSIM (FIG. 1 to FIG. 11) and the international communication system for the physical SIM (FIG. 12 to FIG. 19) in this embodiment, a mobile data volume usable between the telecommunication carriers is exchanged between the overseas travelers via the data volume exchange server 1.

By adopting the international communication system in this embodiment that slowly cooperates with a telecommunication carrier in another country via the data volume exchange server 1, it is possible to appeal differences from other companies to customers and expect customer acquisition.

[Effects]

The data volume exchange server 1 of the present invention includes:

- the terminal IF unit 11T configured to receive an exchange request for a contract data volume of an own country and a contract data volume of another country from the terminals 31A and 31B of subscribers having contract data volumes of telecommunication carriers of countries different from each other;
- the data volume exchange unit 12 configured to perform matching of a pair in which another country that requests a contract data volume in one of the received exchange requests matches the own country that provides a contract data volume in another of the received exchange requests; and
- the server IF units 11A and 11B configured to instruct the communication servers 21A of the telecommunication carriers in the countries to transfer a contract data volume of a matched subscriber of the own country as an exchanged data volume of a subscriber of the other country who is a matching partner.

Consequently, a traveler is capable of performing data communication in a travel destination with a communication charge equivalent to a data communication charge of a telecommunication carrier in his or her own country. Note that a matching fee of the data volume exchange server 1 is charged to the traveler. However, the matching fee is set lower than the data communication charge.

Further, it is possible to reduce labor of the traveler for directly entering into a communication contract in a foreign language with a telecommunication carrier locally (in a foreign country) and performing setting of a terminal. Note that matching operation via the data volume exchange server 1 is necessary. However, since the matching operation is performed by the data volume exchange server 1 that does not depend on a specific country and a specific language, complication of application and setting imposed on the traveler may be small.

In the data volume exchange server 1 of the present invention, the terminal IF unit 11T receives the exchange request in which a use period of a contract data volume of the other country to be exchanged is designated, and the data volume exchange unit 12 preferentially matches a pair having a long overlapping period of use periods of the pair.

Consequently, since travel periods of the pair overlap long, it is possible to increase a use period of an exchange data volume as well.

The present invention is an international communication system including the data volume exchange server 1 and the terminal 31A, wherein the terminal 31A of the subscriber of the own country receives a rewrite signal for an eSIM (Embedded-SIM) in the terminal 31A from the communication server 21B of the telecommunication carrier in the other country to make it possible to use the exchange data volume of the subscriber of the other country.

Consequently, a traveler can smoothly use an exchange data volume of a partner to be paired as a data volume of the traveler without labor for directly meeting the partner and handing a SIM card to the partner.

The present invention is an international communication system including the data volume exchange server 1 and the terminal 31A, wherein the terminal 31A of the subscriber of the own country receives insertion of a physical SIM (the physical SIM for rent 34B) issued by the telecommunication carrier in the other country and performs communication limitation for the exchange data volume notified from the data volume exchange server 1 to make it possible to use the exchange data volume of the subscriber of the other country.

Consequently, by using a mechanism of data share provided by a telecommunication carrier, additional development for a system on the telecommunication carrier side may not be performed.

REFERENCE SIGNS LIST

1 Data volume exchange server
2A A country
2B B country
11T Terminal IF unit
11A, 11B Server IF unit
12 Data volume exchange unit
13 DB management unit
14 Exchange DB
21A, 21B Communication server
31A, 31B Terminal
32A, 32B eSIM
33A, 33B Physical SIM for own country
34A, 34B Physical SIM for rent
141 Exchange request table
142A, 142B Matching table
143 Rental SIM management table

The invention claimed is:

1. A data volume exchange server comprising a computer and memory storing instructions executable to cause the computer to perform operations comprising:

receiving a first exchange request from a first terminal located in a first country and receiving a second exchange request from a second terminal located in a second country, wherein the first exchange request comprises an individual identification number of the first terminal, a subscriber ID of a first subscriber using the first terminal, and the second country to be traveled by the first subscriber, a first travel period, and a first requested data volume, wherein the second exchange request comprises an individual identification number of the second terminal, a subscriber ID of a second subscriber using the second terminal, and the first country to be traveled by the second subscriber, a second travel period, and a second requested data volume, wherein the first travel period overlaps with the second travel period;

performing matching between the first exchange request and the second exchange request based on the first subscriber travelling from the first country to the second country and the second subscriber travelling from the second country to the first country, wherein performing matching comprises determining an exchange travel period as an overlapping period between the first travel period and the second travel period, and determining an exchange data volume by selecting a smaller one between the first requested data volume and the second requested data volume;

comparing the smaller one with a usable data volume of the first terminal in the second country or a usable data volume of the second terminal in the first country;

determining the exchange data volume based on comparison result; and performing exchange of no more than the determined exchange data volume by the first terminal and the second terminal within the exchange travel period.

2. An international communication system comprising:

the data volume exchange server according to claim 1; and the first terminal and the second terminal, wherein the first terminal is configured to perform rewriting to add the exchange data volume to a first Embedded-SIM (eSIM) in the first terminal when the first terminal arrives at the second country, the second terminal is configured to perform rewriting to add the exchange data volume to a second eSIM in the second terminal when the second terminal arrives at the first country.

3. An international communication system comprising:

the data volume exchange server according to claim 1; and the first terminal and the second terminal, wherein the first terminal includes a first physical rental SIM issued by a telecommunication carrier in the second country and uses data up to the exchange data volume in the second country, the second terminal includes a second physical rental SIM issued by another telecommunication carrier in the first country and uses data up to the exchange data volume in the first country.

4. A data volume exchange method performed by a data volume exchange server including a computer, the data volume exchange method comprising:

receiving a first exchange request from a first terminal located in a first country and receiving a second exchange request from a second terminal located in a second country, wherein the first exchange request comprises an individual identification number of the first terminal, a subscriber ID of a first subscriber using the first terminal, and the second country to be traveled by the first subscriber, a first travel period, and a first requested data volume, wherein the second exchange request comprises an individual identification number of the second terminal, a subscriber ID of a second subscriber using the second terminal, and the first country to be traveled by the second subscriber, a second travel period, and a second requested data volume, wherein the first travel period overlaps with the second travel period;

performing matching between the first exchange request and the second exchange request based on the first subscriber travelling from the first country to the second country and the second subscriber travelling from the second country to the first country, wherein performing matching comprises determining an exchange travel period as an overlapping period between the first travel period and the second travel period, and determining an exchange data volume by selecting a smaller one between the first requested data volume and the second requested data volume;

comparing the smaller one with a usable data volume of the first terminal in the second country or a usable data volume of the second terminal in the first country;

determining the exchange data volume based on comparison result; and performing exchange of no more than the determined exchange data volume by the first terminal and the second terminal within the exchange travel period.

5. A non-transitory computer readable medium storing one or more instructions causing a computer to execute:

receiving a first exchange request from a first terminal located in a first country and receiving a second exchange request from a second terminal located in a second country, wherein the first exchange request comprises an individual identification number of the first terminal, a subscriber ID of a first subscriber using the first terminal, and the second country to be traveled by the first subscriber, a first travel period, and a first requested data volume, wherein the second exchange request comprises an individual identification number of the second terminal, a subscriber ID of a second subscriber using the second terminal, and the first country to be traveled by the second subscriber, a second travel period, and a second requested data volume, wherein the first travel period overlaps with the second travel period;

performing matching between the first exchange request and the second exchange request based on the first subscriber travelling from the first country to the second country and the second subscriber travelling from the second country to the first country, wherein performing matching comprises determining an exchange travel period as an overlapping period between the first travel period and the second travel period, and determining an exchange data volume by selecting a smaller one between the first requested data volume and the second requested data volume;

comparing the smaller one with a usable data volume of the first terminal in the second country or a usable data volume of the second terminal in the first country;

determining the exchange data volume based on comparison result; and performing exchange of no more than the determined exchange data volume by the first terminal and the second terminal within the exchange travel period.

* * * * *